United States Patent [19]

Kruidhof

[11] Patent Number: 5,993,503
[45] Date of Patent: Nov. 30, 1999

[54] METHOD FOR DEPHOSPHORIZING PIG MANURE

[75] Inventor: Hendrik Kruidhof, Almelo, Netherlands

[73] Assignee: Ceres Milieu Holding B.V., Enschede, Netherlands

[21] Appl. No.: 08/528,195

[22] Filed: Sep. 14, 1995

[30] Foreign Application Priority Data

Sep. 15, 1994 [NL] Netherlands ............... 9401495

[51] Int. Cl.$^6$ .................................... C05F 3/00
[52] U.S. Cl. ................. 71/21; 71/15; 71/DIG. 2; 435/268
[58] Field of Search ............. 71/15, 21, DIG. 2; 435/268

[56] References Cited

U.S. PATENT DOCUMENTS

| | | | |
|---|---|---|---|
| 4,431,543 | 2/1984 | Matsuo et al. | 210/605 |
| 5,554,399 | 9/1996 | Vanderbeke et al. | 426/49 |

FOREIGN PATENT DOCUMENTS

| | | |
|---|---|---|
| 0287152 | 10/1988 | European Pat. Off. |
| 0335280 | 10/1989 | European Pat. Off. |
| 0363612 | 4/1990 | European Pat. Off. |
| 0498337 | 8/1992 | European Pat. Off. |
| 0530826 | 3/1993 | European Pat. Off. |
| 3441690 | 5/1986 | Germany. |
| 3732896 | 8/1988 | Germany. |
| 4212196 | 4/1993 | Germany. |
| 53-140858 | 5/1978 | Japan ........................ 210/696 |
| 8902933 | 11/1989 | Netherlands .................. 71/21 |

OTHER PUBLICATIONS

Schulze–Rettmer et al. "Experiments with Process of Precipitation of Magnesium–Ammonium–Phosphate from Various Wastewaters." Vom Wasser, vol. 71 pp. 41–53, no mt/88.
Jack Rechcigl. "Soil Amendments and Environmental Quality" p. 171, no mt/95.
Abstract of Japanese Reference JP 63–221,893, Polyresearch Service—Patent Search Department, Holland, 1 p.

*Primary Examiner*—Wayne Langel
*Attorney, Agent, or Firm*—Webb Ziesenheim Logsdon Orkin & Hanson, P.C.

[57] ABSTRACT

The invention relates to a method for dephosphorizing manure, in particular pig manure, comprising of causing phosphate to dissolve, which phosphate is present at least partially in the form of phytate in the manure, separating the manure into a solid and a liquid fraction and removing the phosphate from the liquid fraction of the manure.

Causing phosphate to dissolve can be achieved in different ways, for instance by storing the manure for a predetermined period of time under conditioned circumstances, or by sustaining a continuous movement of the manure at a temperature of at least 15° C., preferably between 20 and 40° C., to allow free escape therefrom of formed gases, or by the presence of means for complexing divalent ions, or by the enzymatic decomposition of phytate present in the manure. The phosphate is preferably removed from the liquid fraction by causing struvite to be precipitated therefrom.

14 Claims, 1 Drawing Sheet

5,993,503

METHOD FOR DEPHOSPHORIZING PIG MANURE

BACKGROUND OF THE INVENTION

1. Field of the Invention

The present invention relates to a method and installation for dephosphorizing pig manure by separating the manure into a solid and liquid fraction and removing phosphate from the liquid fraction.

2. Background Art

The consequences for the environment of over-manuring, such as phosphate saturation, acid rain, ground and drinking-water pollution, are known. The manure surplus problem has resulted in different proposals for the solution thereof. It has not however proved possible up to the present to solve the problem in an economically acceptable manner.

Pig manure, but also manure from poultry, contains phosphor in the form of phytate. The phytate comes from different components of the animal feed. Phytate is the salt of phytinic acid, dihydrogen phosphate, and consists of a sugar molecule with six phosphate molecules. Single-stomach animals such as pigs and chickens are not capable of absorbing sufficient phosphate from the feed. The greatest part of the phytate therefore finds its way, substantially undigested, into the manure.

Because animals such as pigs and poultry need phosphor, inter alia for a good bone structure, and they are themselves unable to absorb sufficient phosphate from their feed, extra phosphor is often added to the feed. The result is a further phosphate impact on the environment.

In order to avoid the addition of phosphor it has recently been proposed to add the enzyme phytase to the feed. Phytase degrades the phytate and makes phosphate available to the animals.

The whole supply of phosphate is still not absorbed by the animals from their feed. On the one hand not all the phytate is broken down by phytase, normally only about 75%, and on the other not all the degraded phosphate is also actually absorbed by the animals. A residual quantity of phosphate therefore remains in the manure. In order to prevent a phosphate saturation of the environment it is therefore important to dephosphorize manure.

European application 0 287 152 describes a method for producing amino acids from manure. As an additional step in the described process, phosphate is removed from the manure by separating the latter into a solid and a liquid fraction, whereafter the liquid fraction is concentrated by means of ultrafiltration. The remaining concentrate then contains, among other things, phosphate.

SUMMARY OF THE INVENTION

The present invention has for its object to provide a method and installation improved relative to the known prior art, with which manure, particularly pig manure, can be dephosphorized.

This is achieved by the method in that prior to the separation into a solid and a liquid fraction the manure is stored for a determined period of time under conditioned circumstances to cause the phosphate to dissolve.

The essence of the invention lies in actively causing phosphate to transpose from the solid fraction to the liquid fraction, i.e. causing phosphate to dissolve and holding it in solution. Only in this way is it possible to remove the phosphate from the liquid fraction of the manure in relatively simple manner.

When the phosphate content of the solid fraction decreases, this solid fraction contains organic material and can be directly disposed of as such or composted, without resulting in an excessive phosphate impact on the environment.

DETAILED DESCRIPTION OF THE PREFERRED EMBODIMENTS

Figure 1:
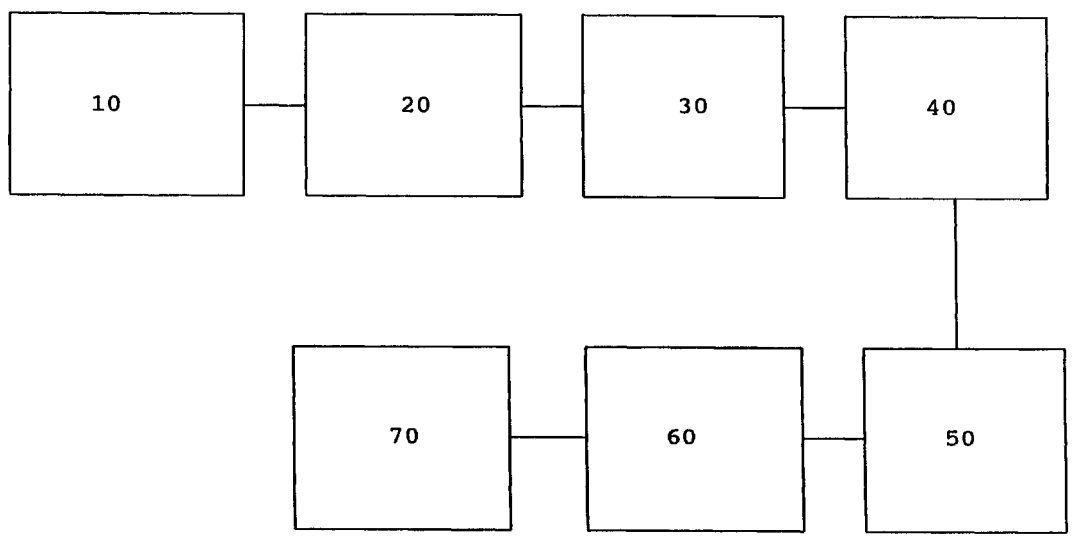
FIG. 1 is a schematic drawing of the apparatus.

The essence of the invention lies in transferring the phosphate to the liquid fraction of the manure, on the one hand the decomposition of phytate must be stimulated while on the other the binding of phosphate in insoluble complexes must be prevented. It has now been found according to the present invention that when the manure is stored for a time under conditioned circumstances the phosphate bound in the phytate dissolves, whereafter following separation of the solid fraction it can be removed from the liquid fraction.

Conditioned circumstances can be formed by a temperature between 0 and 15° C., preferably between 4 and 10° C. In addition, by sustaining a continuous movement of the manure it is possible to work at a higher temperature of 10° C. or more, preferably 15° C. or more, more preferably between 20 and 40° C. By sustaining movement of the manure local supersaturation is prevented, whereby the formation of crystallization nuclei is prevented.

There are different possibilities whereby dissolved phosphate could still precipitate in solid form. Phosphate can on the one hand form with divalent ions such as $Ca^{++}$ or $Mg^{++}$ respectively calcium phosphate or magnesium phosphate. Since these are insoluble the phosphate will thus become once again part of the solid fraction.

Phosphate can likewise disappear from the liquid fraction and return to the solid fraction due to the formation of different minerals such as potassium and ammonium taranakite ($H_6(NH_4, K)_3Al_5(PO_4)_6.18H_2O$), brushite ($CaHPO_4.2H_2O$) or struvite ($Mg(NH_4, K)PO_4.6H_2O$). These minerals tend to precipitate from the liquid fraction of the manure and the phosphate is hereby extracted from this liquid fraction. The solid manure fraction becomes richer in phosphate, and this is unfavorable.

The conditioned circumstances according to the present invention are intended to prevent the above stated minerals being formed. In addition to a low temperature and/or a low pH of less than 8, preferably less than 7, more preferably between 5 and 7, complexing agents for divalent ions can likewise be added to prevent the formation of these minerals. Another option is to ensure that as little as possible of the completing fatty acids already present in the manure can disappear from the manure, for instance by closing the reaction vessel. Such fatty acids can also prevent formation of for instance struvite by complexing calcium and magnesium. The formation of struvite can also be prevented by adding completing agents for monovalent ions or by using agents already present in the manure. Such agents can for instance also be fatty acids. Extra fatty acids such as formic acid, acetic acid and the like can of course also be added.

In order to prevent inter alia struvite formation, the creation of ammonia can be prevented by adding urease-inhibiting substances. These can be added to the feed of the manure-producing animals or to the manure itself. The ammonia concentration in the manure can be reduced by adding $NH_4$-binding substances such as zeolites, KAPTO etc.

After a period of time, for instance after about 2 months of storage at low temperature or for instance after between 1 week and 1 month of storage while being stirred at a higher temperature, the greater part of the phosphate is in the liquid phase. This is the moment at which the solid fraction can be separated from the liquid fraction. The solid fraction can be traded immediately or further composted, while the liquid fraction is subjected to a subsequent treatment.

The liquid fraction contains valuable minerals and can therefore be concentrated for instance. Such a concentration can be achieved by means of membrane systems, an ion separator, such as for instance the Alclar™ ion separator of Lafarge Ion du International (LFI), by electrodialysis or simple concentration by evaporation. The mineral-rich concentrate can be disposed of as such. When the concentrate is also de-watered, for instance by evaporation or drying, mineral-rich fertilizer is formed, the economic value of which can be further increased by adding one or more of the fertilizers N, P, K. In addition, the greater part of the phosphate can be removed from the liquid fraction by causing precipitation of struvite therefrom.

Ammonia may be released during processing of the liquid fraction. Because ammonia also damages the environment, it is recommended to further treat this released ammonia. There are different possibilities therefor. A distinction can herein be made between methods for treating ammonia released from the manure and methods for preventing the release of ammonia. Firstly, the ammonia can be separately crystallized after it has been captured from the air by means of a per se known gas water process. Released ammonia can also be burned, wherein harmless free nitrogen and water are formed. Another option is to add an acid, for instance sulphuric acid, to the liquid fraction, whereby the ammonia is no longer released due to the formation of ammonium sulphate. The released ammonia can also be passed through sulphuric acid whereby solid ammonium sulphate also results.

The foregoing techniques are particularly suitable for applications on comparatively large scale. When manure processing takes place at the location of origin, such as for instance the farm, released ammonia can then be neutralized by means of gas washing with a diluted acid and the liquid released during the gas washing is preferably added to the liquid fraction.

Ammonia can further be removed by nitrification followed by denitrification, for instance by means of microorganisms. Phosphate can be removed from the denitrified liquid fraction by adding calcium hydroxide. Calcium phosphate is precipitated. Adding magnesium oxide results in precipitation of magnesium phosphate and/or potassium struvite.

When after removal of both the phosphate and the ammonia the liquid fraction still contains too much potassium or other ions, this can be removed if required by means of for instance ion-specific membrane systems or an ion exchanger such as the Alclar™ ion separator.

The final result of the above treatments is a clean liquid which can be drained or evaporated without danger to the environment.

After the separation between solid and liquid the solid fraction is preferably washed once again to remove adhering phosphate therefrom. It has been found from experiments that after the separation between solid and liquid about 30% of the phosphate is still present in the solid fraction. The combination of the original liquid fraction and the washing fraction is then further processed in the above described manner.

The decomposition of phytate is found to take place spontaneously through storing of the manure. It is also possible to add extra phosphatase to the manure in order to bring about an enzymatic decomposition of phytate. In preference an alkaline phosphatase is used.

Struvite can be formed by adding magnesium oxide to the liquid fraction of the manure. When due to removal of ammonia therefrom the liquid fraction contains too little ammonia to cause struvite to precipitate efficiently, extra ammonia can be added.

The invention further relates to an apparatus, as shown in FIG. 1, intended to perform the method, comprising at least one container 10 for storage therein of the manure, means for separating the manure into a liquid and a solid fraction 20 and means for removing phosphate from the liquid fraction 30.

Preferred embodiments of the apparatus also comprise means for removing ammonia 40 and optionally potassium from the liquid fraction 50. The apparatus may also comprise means for concentrating the 70 dephosphorized 60 and optionally denitrified liquid fraction 70.

The present invention will be further elucidated with reference to the following example.

EXAMPLE

Materials and Method

The experiments were performed in four stirred, double-walled, closed but not gastight glass reactors with a net volume of approximately 20 litres. The reactors are designated hereinafter A, B, C and D. Each reactor was provided with a temperature control and a stirring time programming.

The tested manure came from pigs which were fed with fattening fodder with a total phosphor content of 0.49%. The manure not used directly in the experiments was stored outside at low temperatures in four 30-litre barrels with a screw cover. The total phosphate content (mg/g) of the barrels at the beginning of storage was respectively 1.584, 1.750, 1.633 and 1.509. The solid content of the manure was roughly 12%. The feed of the pigs providing the manure contained phytase.

Samples were taken in gastight polyethylene pots with screw covers. The samples were stored at 4° C. between sample-taking and analysis. The manure was well dispersed before sample-taking.

Magnesium oxide (MgO) used in the experiments was of livestock feed quality with a low activity. It was prepared by dispersing the required amount in water in 24 hours.

The phosphate content was determined from the liquid fraction of the manure.

Design of the Tests

Test I

The reactors A–D were filled with fresh manure at time t=0. The temperature of reactors A and C was 20° C., that of reactors B and D 40° C. At t=3 days 0.1% MgO was added to reactors C and D.

The phosphate content of the liquid fraction of the manure was determined at t=0, t=7 days and t=14 days.

Test II

In this experiment the content of reactor A was not replaced. Up to the moment of sampling the manure was stirred at 20° C. At t=114 days 0.25% magnesium oxide was added. The phosphate content was determined at t=60 days and t=118 days.

Reactor B was again filled with manure from the barrels which had been stored outside for 2 months (t=0). Stirring subsequently took place for 58 days at 40° C. At t=54 days 0.25% magnesium oxide was added and the temperature set at 20° C. At t=0 and t=58 days the phosphate content was determined.

Reactors C and D were likewise filled at t=0 with manure from barrels stored for 60 days at a low temperature. The temperature in reactor C between t=0 and t=54 days was 20° C., that of reactor D 40° C. At t=54 days 0.25% magnesium oxide was added to reactor C and 0.6% magnesium oxide to reactor D. Thereafter the temperature of both reactors was 40° C. Measurements of the phosphate content were performed at t=0 and t=58 days.

Test III

For this experiment all reactors were filled with manure which had been stored for 5 months at a low temperature. Reactor A had a temperature of 20° C. 0.5% magnesium oxide was added after 4 days. Measurements were performed at t=0, t=4 days and t=7 days.

The temperature in reactor B was 40° C. At t=1 day 40 ppm phytase was added, followed by 0.5% MgO at t=4 days. After 22 days 0.25% $NH_3$ and a further 0.4% magnesium oxide were added. A strong ammonia emission was detected. Samples were taken at t=0, t=4 days, t=7 days, t=22 days (3 hours after addition of the ammonia) and at t=23 days.

No phytase was added to reactor C. 0.5% magnesium oxide was however added at t=4 days, followed by 0.25% $NH_3$ at t=22 days. Immediately thereafter a further 0.25% MgO was added. A strong $NH_3$ emission was also detected here. Samples from which the phosphate content was determined were taken at 0, 4, 7, 22 and 23 days.

Finally, in reactor D 40 ppm phytase was added to the manure at t=1 day. At t=4 days a sample was taken and 1.5% magnesium oxide then added to the reactor. The temperature was 40° C. Sampling took place at t=0, t=4 t=7 days.

Results

The phosphate contents of the various tests are shown in the accompanying tables 1 to 3. In the tables it can be seen that the addition of magnesium oxide causes a fall in the phosphate content in the liquid fraction. This is probably caused by the formation of struvite. From reactors B and C of test III can be seen that the phosphate content of the liquid fraction of the manure decreased significantly through addition of magnesium oxide and ammonia.

Table 1

Test I $PO_4$ content (mg/g) of manure samples from the reactors A, B, C and D at different times.

|        | A      | B      | C      | D      |
|--------|--------|--------|--------|--------|
| t = 0 d. | 0.8825 | 1.0046 | 0.8174 | 0.8322 |
|        | 0.8570 | 0.9840 | 0.9840 | 0.8504 |
| t = 7 d. | 1.3295 | 0.8322 | 0.5121 | 0.4406 |
|        | 1.3934 | 0.8694 | 0.5057 | 0.4319 |
| t = 14 d. | 1.2549 | 0.8045 | 0.4320 | 0.3854 |
|        | 1.2047 | 0.8841 | 0.4645 | 0.3657 |

Table 2

Test II $PO_4$ content (mg/g) of manure samples from the reactors A, B, C and D at different times.

|        | A      | B      | C      | D       |
|--------|--------|--------|--------|---------|
| t = 0 d. | 1.3509 | 1.3606 | 1.3520 | 11.3606 |
|        | 1.3077 | 1.4547 | 1.3528 | 1.4547  |
| t = 58 d. | 0.5861 | 0.7959 | 0.6457 | 0.7959  |
|        | 0.5706 | 0.8014 | 0.6609 | 0.8014  |

Table 3

Test III $PO_4$ content (mg/g) of manure samples from the reactors A, B, C and D at different times.

|        | A      | B      | C      | D      |
|--------|--------|--------|--------|--------|
| t = 0 d. | 1.0099 | 1.0792 | 1.1377 | 1.1051 |
|        | 1.0278 | 1.0966 | 1.1302 | 1.0819 |
| t = 4 d. | 0.9937 | 0.9060 | 0.9717 | 1.0596 |
|        | 1.0344 | 0.9398 | 1.0039 | 1.1194 |
| t = 7 d. | 0.6534 | 0.5206 | 0.5170 | 0.6170 |
|        | 0.6522 | 0.5266 | 0.5266 | 0.6229 |
| t = 22 d. | —    | 0.3964 | 0.2361 | —      |
|        |        | 0.4323 | 0.2292 |        |
| t = 23 d. | —    | 0.3719 | 0.2022 | —      |
|        |        | 0.2695 | 0.1842 |        |

I claim:

1. A method for dephosphorizing manure, comprising the steps:

providing fresh manure comprising solids and liquid, wherein said solids contain phosphate and said phosphate is present at least partially in the form of phytate;

causing said phosphate to dissolve from said solids into said by storing the manure for a period of at least one month at a temperature of between 0 and 15° C. or for a period of at least one week with the manure being continuously in motion at a temperature of at least 15° C.

preventing precipitation of phosphate out of said liquid via at least one of the methods selected from the group consisting of:
a) maintaining the manure at a temperature of 0–15° C.;
b) maintaining the manure at a pH of less than 8;
c) adding complexing agents for divalent ions;
d) preventing loss of complexing fatty acids present in the manure;
e) adding complexing agents for monovalent ions;
f) adding urease-inhibiting substances; and
g) adding $NH_4$-binding substances;

separating the manure into a solid fraction and a liquid fraction; and chemically removing the phosphate from the liquid fraction of the manure.

2. The method as claimed in claim 1, wherein precipitation of phosphate is prevented by maintaining the manure at a temperature between 0 and 15° C.

3. The method as claimed in claim 1, wherein precipitation of phosphate is prevented by adding complexing agents for the presence of means for complexing divalent ions.

4. The method as claimed in claim 1, wherein causing the phosphate to dissolve into solution is achieved by enzymatic decomposition of phytate present in the manure.

5. The method as claimed in claim 1, wherein the phosphate is removed from the liquid fraction by causing struvite to be precipitated therefrom.

6. The method as claimed in claim 5, wherein struvite is precipitated by adding magnesium oxide and/or ammonia to the liquid fraction.

7. The method as claimed in claim 1, wherein the liquid fraction is concentrated in order to obtain mineral-rich concentrate.

8. The method as claimed in claim 1, wherein the liquid is evaporated out of the liquid fraction in order to obtain mineral-rich solid substance.

9. The method as claimed in claim 1, wherein ammonia is removed from the liquid fraction.

10. The method as claimed in claim 1, wherein potassium is removed from the liquid fraction.

11. The method as claimed in claim 1, wherein said step of storing the manure is performed for a period of at least one month at a temperature between 4 and 10° C. or for a period of at least one week at a temperature between 20 and 40° C.

12. The method as claimed in claim 1, wherein said step of storing the manure is performed for a period of two months at a temperature between 0 and 15° C.

13. The method as claimed in claim 2, wherein said step of storing the manure is performed for a period of two months at a temperature between 0 and 15° C.

14. A method for dephosphorizing manure, consisting essentially of the steps:

providing fresh manure comprising solids and liquid, wherein said solids contain phosphate and said phosphate is present at least partially in the form of phytate;

causing said phosphate to dissolve from said solids into said liquid by storing the manure for a period of at least one month at a temperature of between 0 and 15° C. or for a period of at least one week with the manure being continuously in motion at a temperature of at least 15° C.

preventing precipitation of phosphate out of said liquid via at least one of the methods selected from the group consisting of:

a) maintaining the manure at a temperature of 0–15° C.;
b) maintaining the manure at a pH of less than 8;
c) adding complexing agents for divalent ions;
d) preventing loss of complexing fatty acids present in the manure;
e) adding complexing agents for monovalent ions;
f) adding urease-inhibiting substances; and
g) adding $NH_4$-binding substances;

separating the manure into a solid fraction and a liquid fraction; and chemically removing the phosphate from the liquid fraction of the manure.

* * * * *

UNITED STATES PATENT AND TRADEMARK OFFICE
CERTIFICATE OF CORRECTION

PATENT NO. : 5,993,503
DATED : November 30, 1999
INVENTOR(S) : Wayne Langel

It is certified that error appears in the above-identified patent and that said Letters Patent is hereby corrected as shown below:

Column 4 Line 21 "the 70 dephosphorized" should read
--the dephosphorized--.

Column 6 Line 19, refer to Table 3, row A, "1.0344" should read
--1.0334--.

Column 6 Line 33, Claim 1, "said by" should read --said liquid by--.

Column 6 Line 58, Claim 3, after "agents for" delete --the presence of means for complexing--.

Signed and Sealed this

Twenty-fifth Day of July, 2000

Attest:

Attesting Officer

Q. TODD DICKINSON

Director of Patents and Trademarks